United States Patent
Horng et al.

(10) Patent No.: US 7,504,275 B2
(45) Date of Patent: Mar. 17, 2009

(54) LAYOUT DESIGN AND FABRICATION OF SDA MICRO MOTOR FOR LOW DRIVING VOLTAGE AND HIGH LIFETIME APPLICATION

(75) Inventors: Alex Horng, Kaohsiung (TW); I-Yu Huang, Kaohsiung (TW); Yen-Chi Lee, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 43 days.

(21) Appl. No.: 11/812,410

(22) Filed: Jun. 19, 2007

(65) Prior Publication Data
US 2008/0280387 A1    Nov. 13, 2008

(30) Foreign Application Priority Data
May 9, 2007    (TW)    .............................. 96116438 A

(51) Int. Cl.
*H01L 21/00*    (2006.01)

(52) U.S. Cl. ........................... 438/52; 438/53; 257/415; 257/E21.009; 257/E21.499

(58) Field of Classification Search ................ 257/414, 257/E21.009, E21.499; 438/52, 53
See application file for complete search history.

(56) References Cited

U.S. PATENT DOCUMENTS

2008/0157625 A1 *    7/2008    Horng et al. ................ 310/300

* cited by examiner

*Primary Examiner*—David Vu
*Assistant Examiner*—Arman Khosraviani
(74) *Attorney, Agent, or Firm*—Bacon & Thomas, PLLC

(57) ABSTRACT

Provided is a new design and fabrication of scratch drive actuator (SDA) micro rotary motor with low driving voltage and high lifetime characteristics. To substantially reduce the driving voltage from $30\sim150\,V_{o-p}$ to $12\sim30\,V_{o-p}$ ac amplitude, a silicon wafer with very low resistivity ($<0.004\,\Omega$-cm) was firstly adopted as the substrate of SDA micro motor. Furthermore, a novel SDA structure and geometric design for the improvement of lifetime (>75 hrs) and rotational speed (~30 rpm) of SDA micro motor was also demonstrated in this patent.

12 Claims, 5 Drawing Sheets

*(a) Typical SDA micromotor*

*(b) Novel SDA micro motor*

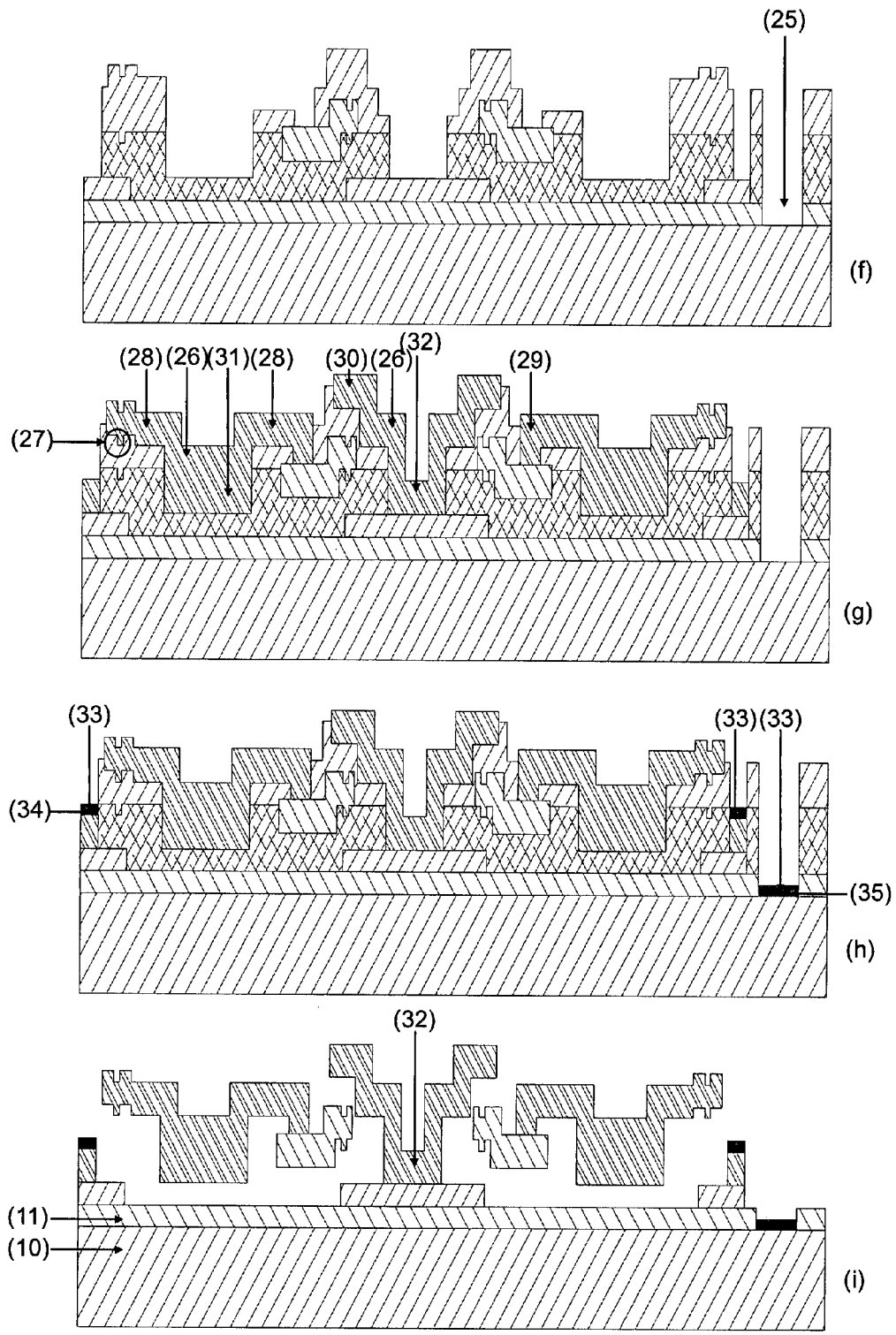
Fig. 3 (Continue)

LAYOUT DESIGN AND FABRICATION OF SDA MICRO MOTOR FOR LOW DRIVING VOLTAGE AND HIGH LIFETIME APPLICATION

FIELD OF THE INVENTION

This invention generally relates to photolithographically patterned SDA micro motor for micro-electromechanical systems (MEMS) applications.

BACKGROUND OF THE INVENTION

The development and application of the miniaturization technology is the major trend of modern science. In particular, the integrated circuits (IC) and microelectromechanical systems (MEMS) technologies are the rudimentary methods of the microscopic world in the recent years. The world's smallest micro fan device in the world with dimension of 2 mm×2 mm (as shown in Appendix 1) is constructed by self-assembly micro blades and micro scratch drive actuators (SDAs). The SDA actuated micro fan is fabricated by using polysilicon based surface micromachining technology (multi-user MEMS processes, MUMPs) as Appendix 2 shows. An implemented micromotor chip is shown in Appendix 3.

Many researches and applications of SDA device have been reported in previous literatures. For instance, Terunobu Akiyama and his co-workers have first proposed the electrostatic controlled stepwise motion (i.e., scratch drive actuator) in polysilicon micro-slider, micro-motor and X/Y stage. As their experimental results show, the velocity of the microstructures is a function of applied pulse frequency and the step length is a function of the peak value of applied pulse and the length of SDA-plate. They also present a new basic reshaping technology to realize three dimensional silicon microstructures.

On the other hand, Ryan J. Linderman and Victor M. Bright proposed a novel MEMS-based micro rotary fan by using solder self-assembly and SDA technologies. Their papers demonstrated an electrostatically-driven MEMS rotary fan that can be further reduced in size and weight by bulk-etching the motor substrate—leaving only a thin structural layer to support the motor and fan blade array. The critical design aspects of SDA devices are the dimensions of the structural polysilicon layer, the bushing, the dielectric layer and the supporting beams. The optimized dimensions adopted in their micro-fan design are: a SDA-plate of 78 μm long by 65 μm wide, a bushing height of 1.5 μm; the 1.5 μm-thick supporting beams has 4 μm wide and 30 μm long.

The SDA micro rotary motor has been developed for more than one decade; however, such device has limited commercial applications due to its high driving voltage (30~150 $V_{o-p}$). To overcome this disadvantage, this patent aims to develop a low driving voltage SDA micro motor using an ultra-low resistivity silicon wafer as chip substrate. A process has been developed which allows for photolithographically patterning a SDA micro motor formed on an ultra-low resistivity (<0.004 Ω-cm) silicon substrate. The ultra-low resistivity silicon substrate can reduce the driving voltage of SDA micro motor from 30~150 $V_{o-p}$ to 12~30 $V_{o-p}$ ac amplitude.

Another drawback of conventional SDA micro motor is its short lifetime. To improve this disadvantage, this invention presents a novel rib and flange structure design for lifetime enhancement, yield improvement and power reduction of SDA micro motor. A novel SDA micro motor with rib and flange structure designs has demonstrated a higher lifetime (>75 hrs) and rotational speed (~30 rpm) in this patent.

SUMMARY OF THE INVENTION

A low driving voltage and high lifetime SDA micro motor is provided in this patent. To substantially reduce the driving voltage from 30~150 $V_{o-p}$ to 12~30 $V_{o-p}$ ac amplitude, a silicon wafer with very low resistivity (<0.004 Ω-cm) was firstly adopted as the substrate of SDA micro motor. In addition to this, to extend lifetime of the SDA micro motor, this invention provided a novel layout including the main structure and flange structure design. Adding the flange structure design in the corner of the beam-to-SDA plate and beam-to-SDA trail, the flange structure can improve the flexural rigidity of the narrow polysilicon beam which will further enhance the device's yield and reduce the crack failure under actuating situation.

Furthermore, a novel rib structure design and a flange layout design for the improvement of lifetime (>75 hrs) and rotational speed (~30 rpm) of SDA micro motor were also demonstrated in this patent.

The major technology adopted in this patent is the polysilicon-based surface micromachining process of microelectromechanical systems (MEMS) technology, with the advantages of batch fabrication, low cost and high compatibility with integrated circuit technology.

BRIEF DESCRIPTION OF THE MAIN DEVICE SYMBOL

Figure 1:
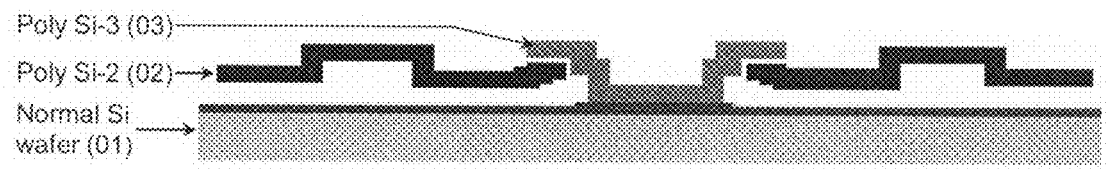
FIG. 1 shows the main structures of traditional and novel SDA micro motors from the simulated results of the L-edit software.
Figure 1:
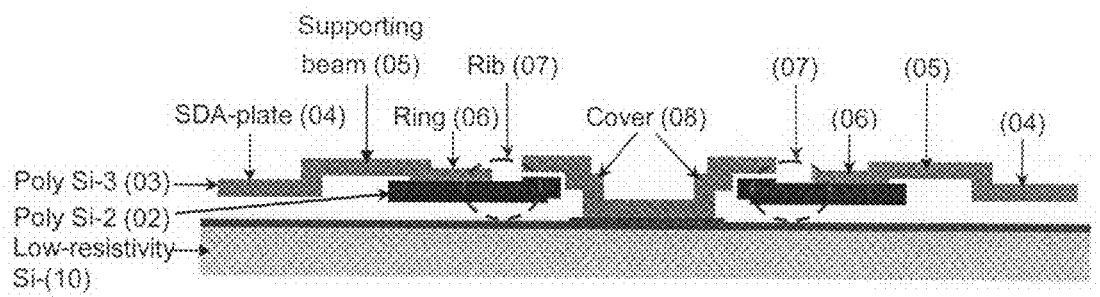

(01) Normal silicon wafer
(02) Poly Si-2
(03) Poly Si-3
(04) SDA-plate
(05) Supporting beam
(06) Ring
(07) Rib
(08) Cover
(09) Flange
(10) Low-resistivity Si substrate
(11) Low-stress $Si_3N_4$
(12) Contact window of substrate
(13) Low stress in-situ doped Poly Si-1
(14) Trail
(15) Pad of anchor
(16) Low stress PSG-1
(17) Dimple window
(18) Bushing window

(19) Low stress in-situ doped Poly Si-2
(20) Rib
(21) Low stress PSG-2
(22) Dimple window
(23) Cover window
(24) Bushing window
(25) Anchor window
(26) Low stress in-situ doped Poly Si-3
(27) Dimple
(28) Supporting beam
(29) Ring
(30) Cover
(31) Bushing
(32) SDA rotor
(33) Cr/Au metal
(34) Biasing pad
(35) Ground pad
(40) SDA micro motor
(41) Micro blade
(42) Polyimide joint Appendix
  Appendix 1: A miniaturized micro fan device fabricated by MEMS technology and constructed by self-assembly micro blades and micro micro scratch-drive actuators (SDAs).
  Appendix2: MEMSCAP's Multi-user MEMS processes (MUMPs)
  Appendix 3: An implemented micromotor chip
  Appendix 4: The cross-sectional and top-view SEM micrographs of the implemented SDA micro motor. The miniaturized 475 µm-wide SDA micro motor with a novel rib structure and a flange layout design.
  Appendix 5: The SEM micrograph of the flange structure design for the improvement of flexural rigidity and lifetime of SDA micro motor.

DETAILED DESCRIPTION OF THE PREFERRED EMBODIMENTS

Figure 2:
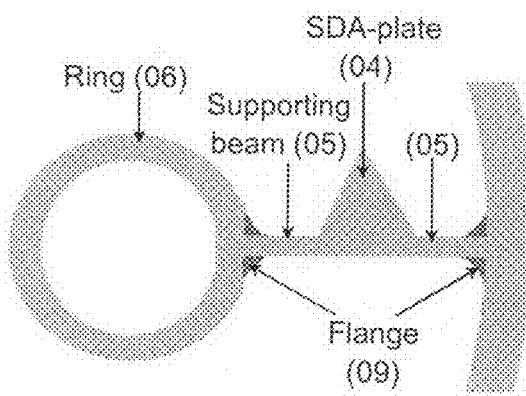
FIG. 2 depicts an innovative "flange" structure design to effectively enhance the structure robustness and the lifetime of SDA micro motor.

Conventional SDA micro motor has limited commercial applications due to its high driving voltage and short lifetime. FIG. 1 shows the main structures of traditional and novel SDA micromotors from the simulated results of the L-edit software. To enhance the break resistance (results from twist force) of the supporting beam (05), present invention utilizes the polysilicon-3 (03) layer to simultaneously construct the SDA-plate (04), supporting beam (05), ring (06) and the cover (08), which form a thicker "rib (07)" structure (stacked by Poly Si-2 (02) and Poly Si-3 (03) layers) adjacent to the ring (06) part; thus, the flexural rigidity and the lifetime of SDA micromotor can be improved. FIG. 2 shows a novel "flange (09)" layout proposed in present invention. The flange design can further enhance the structure robustness of the supporting beam, which will further improve the yield of the SDA micro motor and reduce the crack failure under actuating situation. Appendix 5 shows SEM micrograph of the implemented SDA micro motor with flange layout design. The novel rib and flange structure design for the improvement of lifetime (>75 hrs) and rotational speed (~30 rpm) of SDA micro motor were demonstrated in this patent.

Furthermore, to substantially reduce the driving voltage from 30~150 $V_{o-p}$ to 12~30 $V_{o-p}$ ac amplitude, a silicon wafer with very low resistivity (<0.004 Ω-cm) (10) was firstly adopted as the substrate of SDA micro motor.

Figure 3:
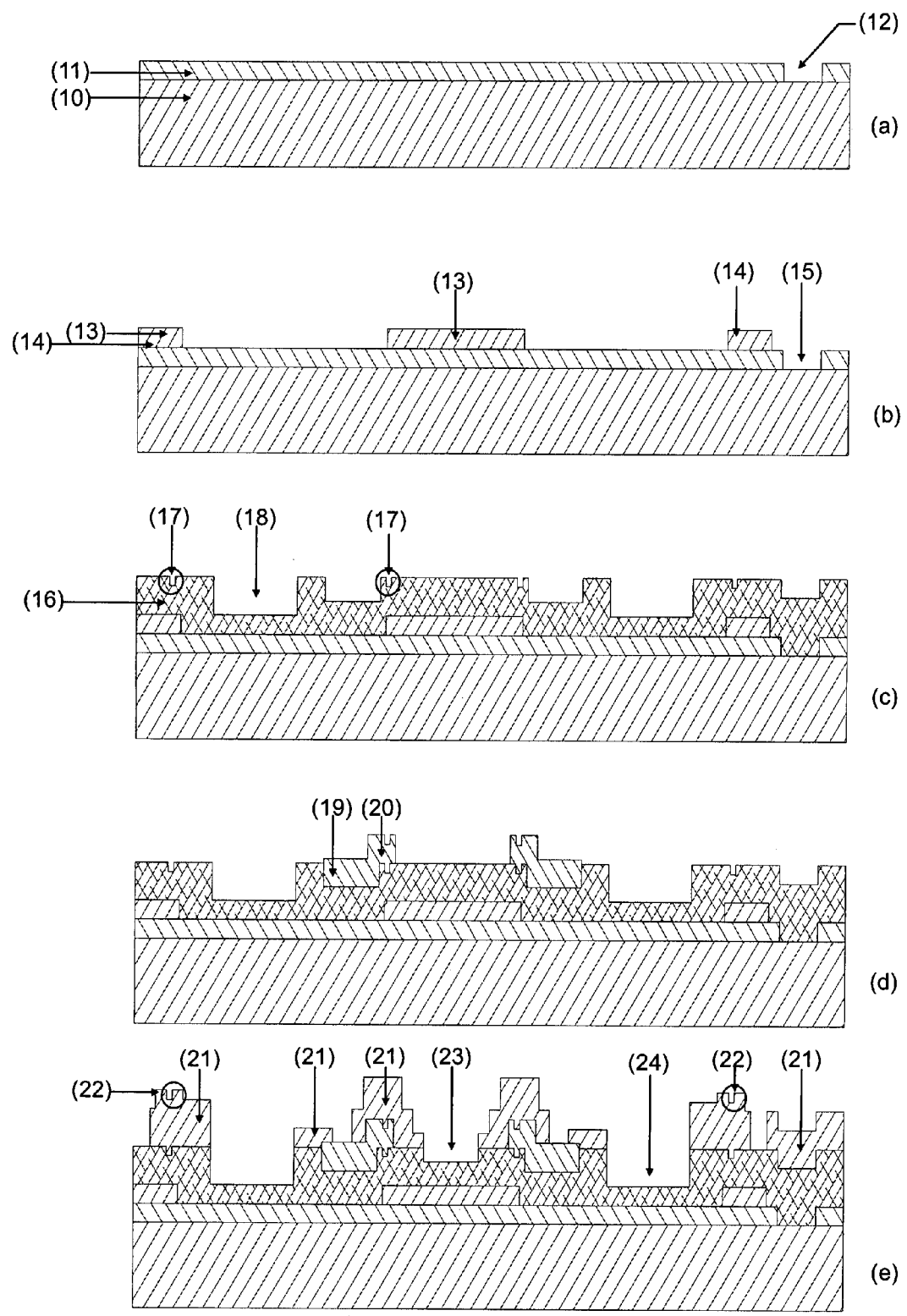
FIG. 3 illustrates the cross-section views of the main process steps of SDA micro motor.

FIG. 3 shows the fabricating flow of the SDA micro motor adopted in this invention. The complete processes at least require eight photolithograph and seven thin film deposition processes. The major manufacturing technology of the present invention is the polysilicon-based surface micromachining process. The main processing steps are described in detail as follows:

(a) Photolithographically patterning the layer of the 600 nm-thick low-stress silicon nitride (11) insulator which is deposited on an ultra-low resistivity silicon substrate (10) by a LPCVD system. As FIG. 3(a) shows, at least one electrical contact window of substrate (12) can be defined in the first photolithograph and etching process.

(b) Using LPCVD system to deposit a 1.5 µm-thick low stress in-situ doped polysilicon (13) layer on or above the silicon substrate. As FIG. 3(b) shows, this invention adopts an inductive-coupling plasma (ICP) etching system to precisely define the areas of trail (14) and the pad of anchor (15) in the secondary photolithographicalling patterning process.

(c) Plasma-enhanced chemical-vapor depositing (PECVD) a 2 µm-thick low stress PSG sacrificial layer (16) on or above the substrate. To precisely control the critical dimension and enhance the etching anisotropy, present invention adopts an ICP dry etching system to pattern at least one 750 nm-depth dimple window (17) and bushing window (18) of SDA micro motor after the third photolithography process (FIG. 3(c)).

(d) Depositing a 2 µm-thick low stress in-situ doped polysilicon (19) layer on or above the substrate by using LPCVD system and patterning it to define at least one rib (20) microstructure of the SDA micro motor by using photolithographic and dry etching processes (FIG. 3(d)).

(e) Depositing a 1.5 µm-thick low stress PSG sacrificial layer (21) on or above the substrate by using PECVD system. The fifth photomask is used to pattern the areas of dimple window (22), cover window (23) and bushing window (24) of SDA micro motor as shown in FIG. 3(e).

(f) Through the sixth photolithographic and dry etching processes, present invention can further define the areas of anchor window (25) of SDA micro motor as shown in FIG. 3(f).

(g) Depositing the third 2 µm-thick low stress in-situ doped polysilicon (26) layer on or above the substrate by using LPCVD system and patterning it to define at least one dimple (27), supporting beam (28), ring (29) cover (30), bushing (31) and SDA rotor (32) of the SDA micro motor by using the seventh photolithograph and dry etching processes (FIG. 3(g)).

(h) Depositing a 200 nm-thick chromium and a 250 nm-thick gold (33) metal films on or above the substrate by using an E-beam evaporator deposition system. In the eighth photolithographic process, this invention utilizes a lift-off method to pattern the chromium and gold metal layers and to define at least one biasing pad (34) and ground pad (35) of the SDA micro motor (FIG. 3(h)).

(i) Under-cut etching the $1^{st}$ and $2^{nd}$ PSG sacrificial layers by using a 49% HF acid solution to release the SDA rotor portion of the SDA micro motor from the substrate, the cover and trail portions of the SDA micro motor remaining fixed to the substrate. After the release process, the free standing SDA rotor can rotate on the silicon nitride insulator under appropriate electrostatic driving (FIG. 3(i)).

Figure 4:
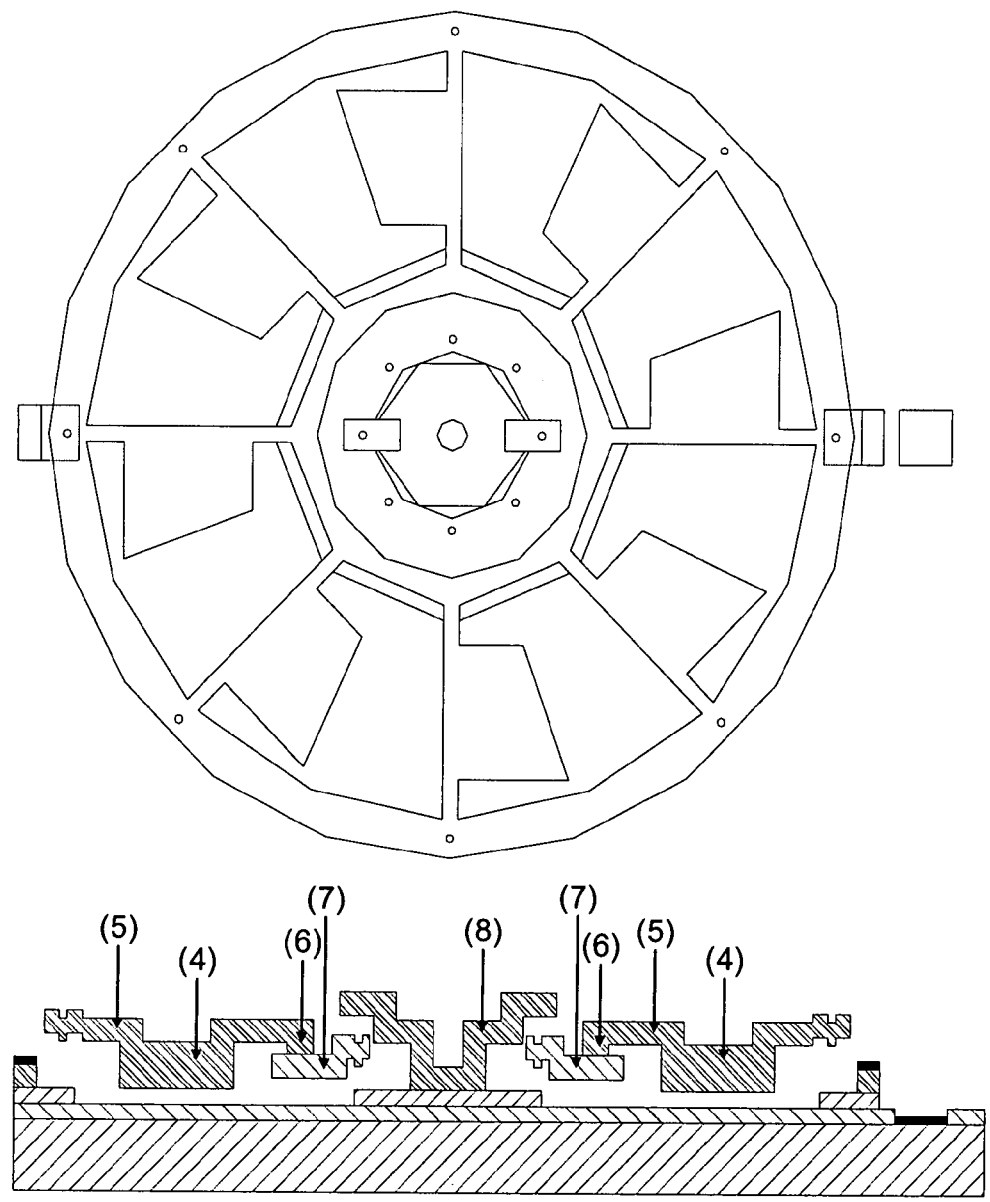
FIG. 4 shows the layout and cross-sectional structure designs of the SDA micro motor proposed in present invention.

FIG. 4 shows the layout and cross-sectional structure designs in present invention, the smallest SDA micro motor in the world with only about 475 µm-wide diameter.

Figure 5:
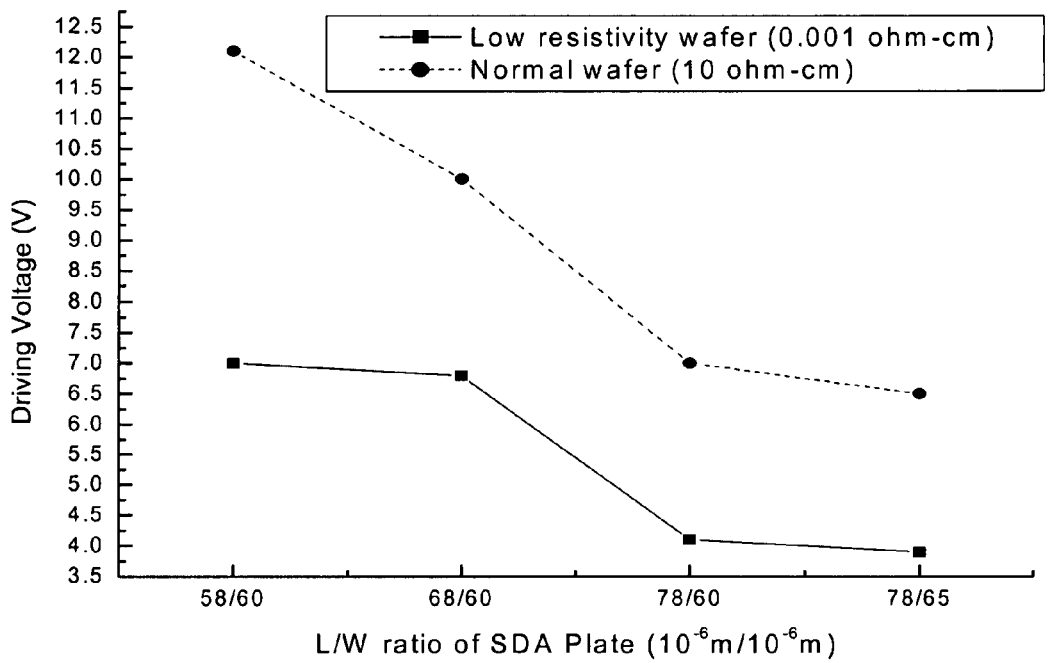
FIG. 5 Driving voltage of single-plate SDA versus L/W ratio for two types of silicon wafers.

Based on the voltage-division theory, the driving voltage of SDA micromotor will decrease with the resistivity of substrate. FIG. 5 compares two SDA actuators (single SDA-plate) with the same layout and fabricating processes but under different resistivity of substrate. The single-plate SDA on the low resistivity wafer has demonstrated a lower driving voltage only about 4~7 $V_{o-p}$. On the other hand, the driving voltage of eight-plate SDA micromotor is measured as 12~30 $V_{o-p}$. This value is much smaller than the results presented in other literatures.

Figure 6:
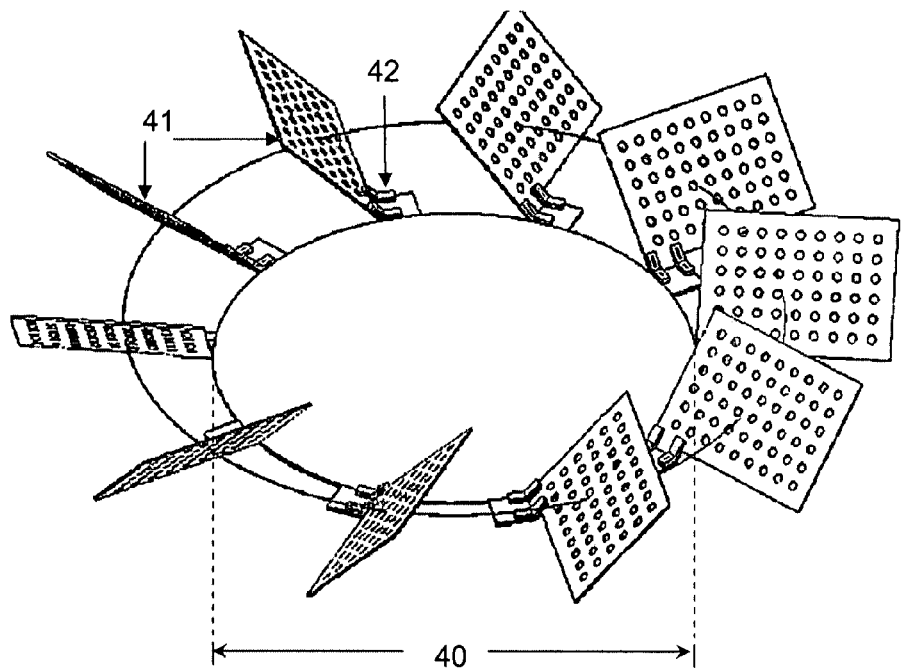
FIG. 6 illustrates a novel design of micro fan actuated by a SDA micro motor.

FIG. 6 illustrates a novel design of a possible application of SDA micro motor (40), the SDA micro fan, which is constructed by the SDA micro motor (40) and eight polyimide self-assembly micro-blades (41). The basic actuating mechanism of polyimide self-assembling utilizes the surface tension force of the polyimide elastic joint (42) generated during the high-temperature reflow process to lift the structural layer.

What is claimed is:

1. A method for forming a SDA-based micro motor comprising the steps of:
   a. depositing a first layer of silicon nitride insulator material on or over an ultra low resistivity silicon substrate, the silicon nitride insulator having a little tensile stress and a low friction coefficient;
   b. photolithographically patterning the layer of low stress nitride insulating material to form at least one electrical contact window of the low resistivity silicon substrate;
   c. depositing the second layer of material on or above the nitride deposited silicon substrate, which is an in-situ doped polysilicon material having a very low stress;
   d. photolithographically patterning the $1^{st}$ low stress in-situ doped polysilicon structural layer to form at least one trail of the SDA micro motor and one pad of anchor;
   e. depositing the third layer of material on or above the substrate, which is a phosphosilicate (PSG) material having a low stress gradient and acts as a sacrificial layer of the structural layer of the SDA micro motor;
   f. photolithographically patterning the $1^{st}$ low stress PSG sacrificial layer to define at least one bushing window and one dimple window of the SDA micro motor;
   g. depositing the fourth layer on or over the $1^{st}$ PSG sacrificial layer, which is an in-situ doped polysilicon material having a very low stress gradient;
   h. photolithographically patterning the $2^{nd}$ in-situ doped low stress polysilicon layer to define at least one rib microstructure portion of the SDA micro motor;
   i. depositing the fifth layer of material on or over the rib and a portion of the $1^{st}$ PSG sacrificial layer, which is a phosphosilicate (PSG) material having a low stress gradient and acts as a $2^{nd}$ sacrificial layer of the structural layer of SDA micro motor;
   j. photolithographically patterning the $2^{nd}$ PSG sacrificial layer to define at least one dimple window and one bushing window;
   k. photolithographically patterning the $1^{st}$ and $2^{nd}$ PSG sacrificial layer to define at least one cover window of the SDA micro motor;
   l. depositing the sixth layer of material on or over a portion of the rib and a portion of the $2^{nd}$ PSG sacrificial layer, which is an in-situ doped polysilicon material having a very low stress gradient and acts as a main structural layer of the SDA micro motor;
   m. photolithographically patterning the $3^{rd}$ low stress polysilicon structural layer to define the cover portion and at least one SDA rotor portion of the micro motor;
   n. depositing the seventh layer of material on or over the $3^{rd}$ low stress polysilicon layer and a portion of the $2^{nd}$ PSG sacrificial layer, which is composed of chromium and gold metal layers;
   o. photolithographically patterning the chromium and gold metal layers to define the biasing and ground pads of the SDA micro motor;
   p. under-cut etching the $1^{st}$ and $2^{nd}$ PSG sacrificial layers to release the SDA rotor portion of the SDA micro motor from the substrate, the cover and trail portions of the SDA micro motor remaining fixed to the substrate, and after the release process, the free standing SDA rotor can rotate on the silicon nitride insulator under appropriate electrostatic driving.

2. The method of claim 1, wherein the said ultra low resistivity silicon substrate means its resistivity must be less than 0.004 Ω-cm; and wherein said ultra low resistivity (<0.004 Ω-cm) silicon wafer was firstly adopted as the substrate of SDA micro motor for effectively reducing the driving voltage from 30~150 $V_{o-p}$ to 12~30 $V_{o-p}$ ac amplitude.

3. The method of claim 1, wherein the step of depositing the layer of the insulator material comprises the step of deposition and post annealing processes by using a low-pressure chemical vapor deposition (LPCVD) system; and wherein said low stress silicon nitride insulator means its stress must be controlled under 250 MPa.

4. The method of claim 1, wherein the electrical contact window of the low resistivity silicon substrate is reserved for the electrical contact of metal layer and the silicon substrate; and wherein the driving of the SDA micro motor, the said ultra low resistivity silicon substrate acts as a ground electrode and a mechanical supporting.

5. The method of claim 1, wherein the step of depositing the layer of the low stress in-situ doped polysilicon material comprises the step of deposition, in-situ doping and post annealing processes in a low-pressure chemical vapor deposition (LPCVD) system, wherein each sub-process of this step is proceeding under different pressure, gas flow and temperature; and wherein said low stress polysilicon thin structural film means its stress must be controlled under 200 MPa.

6. The method of claim 1, wherein the step of depositing the layer of the low stress PSG sacrificial material comprises the step of deposition and post annealing processes by using a plasma-enhanced chemical vapor deposition (PECVD) system; and wherein said low stress PSG sacrificial material means its stress must be controlled under 300 MPa.

7. The method of claim 1, wherein the step of depositing the layer of the sacrificial material comprises the step of depositing a low stress phosphosilicate (PSG).

8. The method of claim 1, wherein the said rib structure design and flange geometric design were firstly adopted in the design and fabrication of SDA-based micro motor for the improvement of lifetime (>75 hrs) and rotational speed (~30 rpm).

9. A method for forming a micro fan comprising the steps of:
   a. fabricating the SDA micro motor following the processes described in claim 1 except the last releasing process;
   b. spin coating a polyimide thin film on or over the said $3^{rd}$ low stress polysilicon structural layer of the SDA micro motor;
   c. photolithographically patterning and etching an elastic joint form on the said polyimide thin film;
   d. under-cut etching the $1^{st}$ and $2^{nd}$ PSG sacrificial layers to release the SDA rotor portion and the micro blade portion of the SDA micro fan from the substrate, the cover and trail portions of the SDA micro motor remaining fixed to the substrate;

e. carrying out a reflow process to result in contraction of the said polyimide elastic joint to rotate and lift a predefined micro blade portion, the lift angle of micro blade portion can be controlled by tuning the reflow temperature of polyimide layer; and wherein after said structure releasing and polyimide curing process, the free standing SDA micro fan can rotate on the silicon substrate under appropriate electrostatic driving.

10. The method of claim 9 wherein the method of forming the lifted micro blade results in a polyimide self-assembling microstructure; and wherein the basic actuating mechanism of polyimide self-assembling utilizes the surface tension force of the polyimide elastic joint generated during the high-temperature reflow process to lift the structural layer.

11. The method of claim 9 wherein the etching step is an under-cut etching process.

12. The method of claim 9 wherein the step of etching is a selective etching process, the step uses a diluted HF acid which etches the PSG sacrificial layers much faster than the polysilicon structural layer.

* * * * *